United States Patent
Jung et al.

[11] Patent Number: 5,556,822
[45] Date of Patent: Sep. 17, 1996

[54] CATALYST SYSTEM FOR POLYERMIZATION OF OLEFIN

[75] Inventors: Il N. Jung; Joon S. Han; Eun J. Cho, all of Seoul; Young T. Jeong; Kap K. Kang, both of Kyungsangnam-Do, all of Rep. of Korea

[73] Assignee: Korea Institute of Science and Technology, Seoul, Rep. of Korea

[21] Appl. No.: 491,212

[22] Filed: Jun. 19, 1995

[30] Foreign Application Priority Data

Aug. 12, 1994 [KR] Rep. of Korea ............... 33314/1994

[51] Int. Cl.$^6$ ........................................... B01J 21/06
[52] U.S. Cl. ................... 502/125; 502/127; 502/113
[58] Field of Search .............................. 502/103, 118, 502/124, 125, 127

[56] References Cited

U.S. PATENT DOCUMENTS

| | | | |
|---|---|---|---|
| 4,816,433 | 3/1989 | Terano et al. | 502/127 |
| 4,927,797 | 5/1990 | Ewen | 502/127 |
| 5,028,671 | 7/1991 | Kioka et al. | 502/125 |
| 5,075,396 | 12/1991 | Kashiwa et al. | 502/127 |
| 5,162,465 | 11/1992 | Kerth | 526/128 |
| 5,233,069 | 8/1993 | Jung et al. | 556/435 |
| 5,244,989 | 9/1993 | Hara et al. | 502/113 |
| 5,296,624 | 3/1994 | Larson et al. | 556/435 |
| 5,308,818 | 5/1994 | Shamshoum et al. | 502/125 |

*Primary Examiner*—Glenn A. Caldarola
*Attorney, Agent, or Firm*—Oblon, Spivak, McClelland, Maier & Neustadt, P.C.

[57] ABSTRACT

There is an olefin catalyst system containing a Zielger-Natta catalyst with as an electron donor, an organosilane compound as represented by the formula (I);

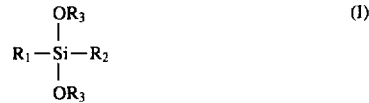

wherein $R_1$ is trimethylsilylmethyl or 2-phenylpropyl; $R_2$ is cyclopenty or cyclohexyl; and $R_3$ is $C_1$-$C_3$ alkyl.

3 Claims, No Drawings

5,556,822

CATALYST SYSTEM FOR POLYERMIZATION OF OLEFIN

BACKGROUND OF THE INVENTION

1. Field of the invention

The present invention relates to a polymerization catalyst system, and more particularly, to an olefin polymerization catalyst system containing a Ziegler-Natta polymerizing catalyst and an alkoxysilane as an electron donor.

2. Description of the Prior Art

The polymerization of olefin always involves the use of a catalyst to provide polymers having desirable properties. The voluminous number of catalysts, denoted as Ziegler-Natta-type catalyst systems, are known in the art. In general, an olefin polymerization catalyst system includes an organometal compound of the Group I–III and a transition metal halide. Organic compounds of Al, Zn, Be, Mg, etc., for example $(CH_3)_3Al$, $(CH_2CH_3)_3Al$, $(CH_2CH_3)_2ClAl$ and $(CH_2CH_3)Cl_2Al$ are used as the organometal compound. Halides of Ti, V, Zr, Cr, etc., for example $TiCl_4$, $TiCl_3$, $TiBr_3$, $VCl_4$ and $VOCl_3$, are used as the transition metal halide.

In olefin polymerization, reaction conditions and catalysts can be selected according to the kind of olefin, polymerization type and other factors.

Polymerization catalyst activity is measured by weight of polymer per unit weight of catalyst in 2 hours (Kg-polymer/g-catalyst.2hr). In addition to catalyst activity, for polyolefin production in commercial scale, large isotacticity and large bulk density (g/ml) are desirable.

In order to increase the yield of polyolefin, improvement of a catalyst as well as improvement of activation of a catalyst and development of a cocatalyst or an electron donor have been studied.

An electron donor functions to decrease the production of atactic polymer and control or increase the production of isotactic polymer in olefin polymerization. Although a broad range of compounds are known to be used as an electron donor, certain compounds are especially compatible to a particular compound or a group of compounds. Therefore, properties such as the isotactic index of products, molecular weight distribution, melt flow etc. can be improved by selection of a high performance electron donor.

Parodi et al. reports that alkoxysilane is useful as an external electron donor in an olefin polymerization to increase isotactic products (Eur. Pat. 45977). Seppala et al. reports that the effect of alkoxysilane as an external electron donor depends on the number and the size of its alkoxy group and the size of hydrocarbon substituted in silicon atom, and too much sterically-hindered hydrocarbon does not make effects although the isotactic product increases in proportion to the size of the hydrocarbon.

U.S. Pat. No. 4,816,433 sets forth cyclohexyl or cyclopentyl alkoxysilane is useful in producing a polyolefin having high stereoregularity.

U.S. Pat. No. 4,927,797 sets forth an olefin polymerization catalyst system containing an electron donor compound of the formula:

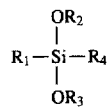

wherein $R_1$ is a bulky, basic alkyl or cycloalkyl group containing at least one secondary or tertiary carbon atom; $R_2$ and $R_3$ are alkyl or aryl groups; and $R_4$ is an alkyl group with a primary carbon atom attached to the silicon atom.

U.S. Pat. No. 5,296,624 sets forth that sterically-hindered organosilanes such as neopentyl alkoxysilanes or trimethyl alkoxysilanes are effective electron donors in polymerization reactions.

SUMMARY OF THE INVENTION

In accordance with the present invention, a catalyst system containing a Ziegler-Natta catalyst with a silane compound as represented by the formula (I) is provided;

wherein $R_1$ is trimethylsilylmethyl or 2-phenyl propyl; $R_2$ is $C_3$-$C_6$ branched, or unbranched or alkyl cycloalkyl, preferably 1-hexyl, cyclohexyl, cyclopentyl, n-butyl, iso-butyl or propyl; and $R_3$ is $C_1$-$C_3$ alkyl.

DETAILED DESCRIPTION OF THE INVENTION

The catalyst system of the present invention, which is effective in polymerization of polymers having very high isotacticity in high yield, contains, as an electron donor, a silane compound as represented by the formula (I);

wherein $R_1$ is trimethylsilylmethyl or 2-phenyl propyl; $R_2$ $C_3$-$C_6$ branched, or unbranched alkyl or cycloalkyl, preferably 1-hexyl, cyclohexyl, cyclopentyl, n-butyl, iso-butyl or propyl; and $R_3$ is $C_1$-$C_3$ alkyl.

The present inventors report that the formula (I) compound can be prepared by a hydrosilation reaction of organochlorosilanes of the following formula (II) having sterically-hindered organic groups and Si—H bond with olefin such as 1-hexene, cyclohexene, n-butylene, iso-butylene and propylene, and an alkoxylation (Korean patent application No. 94-23400)

wherein $R_1$ is trimethylsilylmethyl or 2-phenyl propyl.

The formula (II) compound, which is the starting material for preparing the formula (I) compound can be prepared by a method disclosed in the U.S. Pat. No. 5,233,069 owned by the present applicant. The disclosures of these patent and patent application are hereby incorporated as references.

The catalyst system according to the present invention can be used in olefin polymerization in various $C_2$–$C_4$ olefin and a mixture thereof, preferably in propylene polymerization.

In the catalyst system of the present invention, the Zielger-Natta catalyst is not defined, however, the Ziegler-Natta catalyst comprising alkyl aluminum and titanium halide is preferable. In the catalyst system of the present invention, the molar ratio of the electron donor to the organometal compound in Ziegler-Natta catalyst is in the range of 1–200, preferably 10–100.

The preferred embodiments of the present invention will now be further described with reference to specific examples. While specific embodiments of the invention have been described in considerable detail, variations and modifications of these embodiments can be effected without departing from the spirit and scope of the invention as described and claimed.

EXAMPLE 1

Preparation of Polymerization Catalyst

In a 1L round-bottomed flask equipped with a magnetic stirrer and a condensor, under nitrogen atmosphere, 100 ml of decane and 10 g of diethoxy magnesium were added and stirred to form a suspension. To the suspension 80 ml of $TiCl_4$ was added with a syringe. The mixture was heated to 130° C. and 7.4 ml of n-butyl phthalate was added. The mixture was then reacted for 4 hours. After completion of the reaction, the reaction mixture was filtered. To the obtained solid, 100 ml of decane and 80 ml of $TiCl_4$ were added with a syringe, and the mixture was heated to 130° C. and reacted for 4 hours. After completion of the second reaction, the reaction mixture was filtered. The obtained solid was washed several times with 200 ml of hexane. The solid product was dried under nitrogen gas. The content of titanium in the solid catalyst was determined to be 2.8 wt %.

EXAMPLE 2

Polymerization of Propylene with Cyclopentyl(2-phenylpropyl) dimethoxysilane (CPPDMS)

Under nitrogen gas, in a 2 L stainless steel reactor which had been purged with nitrogen, 900 ml of n-hexane was added. 5.361 mmol of triethyl aluminum (TEA) and 0.212 mmol of cyclopentyl(phenylpropyl) dimethoxysilane (CPPDMS) were added with a syringe and 10 mg of the catalyst prepared in Example 1 was added. From the reactor charged with nitrogen gas, inert gas was removed by using vacuum pump. 8.93 mmol of hydrogen was provided and propylene gas was introduced into the reactor and subjected to polymerization for 2 hours while maintaining the pressure at 10 $kg/cm^2.G$ and a temperature of 70° C. After polymerization, the unreacted gases were slowly released, and then the slurry type product was filtered and dried in a vacuum at a temperature of 40° C. for 24 hours to obtain a polymer powder.

The Al/Si ratio was calculated from the amount of TEA and silane compound used. Isotacticity of the powder was determined from a polymer insoluble in n-heptane by extracting the solid polymer with boiling n-heptane for 6 hours and drying the remaining polymer in a vacuum drier at the temperature of 70° C. to obtain a polymer insoluble in n-heptane.

Experiments were carried out in the same manner as described in the above, except that the amount of CPPDMS used were as shown in Table 1. The results are shown in Table 1.

TABLE 1

| | | | Catalyst properties containing CPPDMS | | | |
|---|---|---|---|---|---|---|
| Exper. No. | TEA mmol | CPPDMS mmol | TEA/CPPDMS mol. ratio | Cat. activity Kg-pol./g-cat.2h | isotacticity % | bulk den. g/ml |
| 1 | 5.361 | 0     | —     | 21.2 | 75.6 | 0.42 |
| 2 | 5.361 | 0.053 | 101.2 | 32.8 | 98.5 | 0.42 |
| 3 | 5.361 | 0.106 | 50.2  | 34.0 | 98.6 | 0.42 |
| 4 | 5.361 | 0.159 | 33.7  | 33.7 | 98.7 | 0.42 |
| 5 | 5.361 | 0.212 | 25.3  | 34.3 | 98.8 | 0.42 |
| 6 | 5.361 | 0.319 | 16.8  | 33.6 | 98.9 | 0.42 |
| 7 | 5.361 | 0.424 | 12.6  | 30.9 | 98.9 | 0.42 |

EXAMPLE 3

Polymerization of Propylene with Cyclopentyl (trimethylsilylmethyl) dimethoxysilane (CTSDMS)

Experiments were carried out in the same manner as described in Example 2 except that as an electron donor, cyclopentyl(trimethylsilylmethyl) dimethoxysilane (CTSDMS) was used instead of CPPDMS in the amounts as shown in Table 2. The results are shown in Table 2.

TABLE 2

| | | | Catalyst properties containing CTSDMS | | | |
|---|---|---|---|---|---|---|
| Exper. No. | TEA mmol | CTSDMS mmol | TEA/CTSDMS mol. ratio | Cat. activity Kg-pol./g-cat.2h | isotacticity % | bulk den. g/ml |
| 8  | 5.361 | 0     | —     | 21.2 | 75.6 | 0.42 |
| 9  | 5.361 | 0.053 | 101.2 | 33.5 | 98.5 | 0.42 |
| 10 | 5.361 | 0.106 | 50.2  | 34.4 | 98.7 | 0.42 |
| 11 | 5.361 | 0.159 | 33.7  | 35.6 | 98.7 | 0.42 |
| 12 | 5.361 | 0.212 | 25.3  | 36.0 | 98.9 | 0.42 |
| 13 | 5.361 | 0.319 | 16.8  | 35.4 | 99.0 | 0.42 |
| 14 | 5.361 | 0.424 | 12.6  | 33.1 | 99.0 | 0.42 |

EXAMPLE 4

Polymerization of Propylene with Other Organosilane Compounds

Experiments were carried out in the same manner as described in Example 2 except that the amount of a organosilane compound was 0.212 mmol and as an electron donor, hexyl(2-phenylpropyl) dimethoxysilane (HPPDMS), cyclohexyl(2-phenylpropyl) dimethoxysilane (CHPPDMS), n-butyl(2-phenylpropyl) dimethoxysilane (NBPPDMS), iso-butyl(2-phenylpropyl) dimethoxysilane (IBPPDMS), propyl(2-phenylpropyl) dimethoxysilane (PPPDMS), hexyl(trimethysilylmethyl) dimethoxysilane (HTSDMS), cyclohexyl(trimethysilylmethyl) dimethoxysilane (CHTSDMS), n-butyl(trimethysilylmethyl) dimethoxysilane (NBTSDMS), iso-butyl(trimethysilylmethyl) dimethoxysilane (IBTSDMS) or propyl(trimethysilylmethyl) dimethoxysilane (PTSDMS) was used instead of CPPDMS. The results are shown in Table 3.

What is claimed is:

1. An olefin polymerization catalyst system containing a titanium halide-alkylaluminum Ziegler-Natta catalyst and an electron donor which is an organosilane compound of formula (I):

wherein $R_1$ is trimethylsilylmethyl or 2-phenylpropyl; $R_2$ is cyclopentyl or cyclohexyl; and $R_3$ is $C_1$-$C_3$-alkyl.

2. The catalyst system according to claim 1, wherein the molar ratio of the electron donor to organometal compounds in Ziegler-Natta catalyst is in the range of 1–200.

3. The catalyst system according to claim 1, wherein said olefin is propylene.

TABLE 3

| | | Catalyst properties containing various silane | | | |
|---|---|---|---|---|---|
| Exper. No. | TEA mmol | E.donor mmol | TEA/E.donor mol. ratio | Cat. activity Kg-pol./g-cat.2h | isotacticity % | bulk den. g/ml |
| HPPDMS | 5.361 | 0.212 | 25.3 | 26.6 | 98.8 | 0.30 |
| CHPPDMS | 5.361 | 0.212 | 25.3 | 31.0 | 98.2 | 0.40 |
| NBPPDMS | 5.361 | 0.212 | 25.3 | 34.0 | 98.8 | 0.40 |
| IBPPDMS | 5.361 | 0.212 | 25.3 | 28.7 | 98.6 | 0.40 |
| PPPDMS | 5.361 | 0.212 | 25.3 | 35.5 | 98.0 | 0.40 |
| HTSDMS | 5.361 | 0.212 | 25.3 | 22.8 | 98.3 | 0.40 |
| CHTSDMS | 5.361 | 0.212 | 25.3 | 29.0 | 98.5 | 0.40 |
| NBTSDMS | 5.361 | 0.212 | 25.3 | 25.3 | 98.2 | 0.30 |
| IBTSDMS | 5.361 | 0.212 | 25.3 | 24.4 | 98.1 | 0.40 |
| PTSDMS | 5.361 | 0.212 | 25.3 | 33.1 | 98.1 | 0.39 |

* * * * *

UNITED STATES PATENT AND TRADEMARK OFFICE
CERTIFICATE OF CORRECTION

PATENT NO. : 5,556,822
DATED : September 17, 1996
INVENTOR(S) : Il N. JUNG, et al.

It is certified that error appears in the above-indentified patent and that said Letters Patent is hereby corrected as shown below:

On the title page, Item [54], and on the top of Column 1, the title should read:

CATALYST SYSTEM FOR POLYMERIZATION OF OLEFIN. --

Signed and Sealed this

Tenth Day of December, 1996

Attest:

BRUCE LEHMAN

*Attesting Officer*     *Commissioner of Patents and Trademarks*